(12) United States Patent
Telkamp et al.

(10) Patent No.: US 7,062,130 B2
(45) Date of Patent: Jun. 13, 2006

(54) LOW-LOSS OPTICAL WAVEGUIDE CROSSOVERS USING AN OUT-OF-PLANE WAVEGUIDE

(76) Inventors: Arthur Telkamp, 41 San Leon, Irvine, CA (US) 92606; Randy Bindrup, 22251 Parkwood St., Lake Forest, CA (US) 92630

( * ) Notice: Subject to any disclaimer, the term of this patent is extended or adjusted under 35 U.S.C. 154(b) by 76 days.

(21) Appl. No.: 10/782,481

(22) Filed: Feb. 18, 2004

(65) Prior Publication Data
US 2004/0258361 A1    Dec. 23, 2004

Related U.S. Application Data

(60) Provisional application No. 60/485,065, filed on Jul. 7, 2003, provisional application No. 60/467,341, filed on May 1, 2003.

(51) Int. Cl.
*G02B 6/26* (2006.01)
(52) U.S. Cl. .................... 385/50; 385/16; 385/17; 385/39
(58) Field of Classification Search ............... 385/17, 385/42, 131, 16, 39, 50
See application file for complete search history.

(56) References Cited

U.S. PATENT DOCUMENTS 4,693,547 A    9/1987  Soref et al.
5,039,191 A    8/1991  Myszka
5,235,672 A    8/1993  Carsin
5,245,458 A    9/1993  Taylor (Continued)

FOREIGN PATENT DOCUMENTS

DE    3817035 C1    8/1989

(Continued)

OTHER PUBLICATIONS

Bahadori, et al., *Automated Fiber-Waveguide Array Alignment*, Journal of Optical Communications, Fachverlag Schiele & Schon, Berlin, Germany, vol. 10, No. 2, Jun. 1, 1989, pp. 54-55.

(Continued)

*Primary Examiner*—John D. Lee
*Assistant Examiner*—James D. Stein

(57) ABSTRACT

An improved low-loss waveguide crossover uses an out-of-plane, such as vertical, waveguide to bridge over any number of waveguides with very low, or essentially no, optical loss or crosstalk. Optical signals transmitted in a waveguide system having the improved waveguide crossover can cross over one or multiple transverse waveguides with a greatly reduced loss of signal intensity by using a second waveguide (such as a bridge) positioned in a second plane different from the plane containing the transverse waveguides. An optical signal from the input waveguide is coupled efficiently through directional coupling to the bridge waveguide and optionally from the bridge waveguide to the output waveguide. Methods for fabricating the improved waveguide crossover are described.

31 Claims, 12 Drawing Sheets

U.S. PATENT DOCUMENTS

| | | | |
|---|---|---|---|
| 5,278,692 A | 1/1994 | Delapierre | |
| 5,357,590 A | 10/1994 | Auracher | |
| 5,596,662 A | 1/1997 | Boscher | |
| 5,612,815 A | 3/1997 | Labeye et al. | |
| 5,623,564 A | 4/1997 | Presby | |
| 5,757,986 A | 5/1998 | Crampton et al. | |
| 5,761,350 A | 6/1998 | Koh | |
| 5,828,800 A | 10/1998 | Henry et al. | |
| 5,848,206 A | 12/1998 | Labeye et al. | |
| 5,920,665 A | 7/1999 | Presby | |
| 5,923,798 A | 7/1999 | Aksyuk et al. | |
| 5,926,594 A | 7/1999 | Song et al. | |
| 5,970,192 A | 10/1999 | Osugi et al. | |
| 5,990,473 A | 11/1999 | Dickey et al. | |
| 6,072,924 A | 6/2000 | Sato et al. | |
| 6,101,299 A | 8/2000 | Laor | |
| 6,122,423 A | 9/2000 | You et al. | |
| 6,137,941 A | 10/2000 | Robinson | |
| 6,148,124 A | 11/2000 | Aksyuk et al. | |
| 6,169,826 B1 | 1/2001 | Nishiyama et al. | |
| 6,175,675 B1 | 1/2001 | Lee et al. | |
| 6,205,267 B1 | 3/2001 | Aksyuk et al. | |
| 6,219,472 B1 | 4/2001 | Horino et al. | |
| 6,253,011 B1 | 6/2001 | Haake et al. | |
| 6,275,326 B1 | 8/2001 | Bhila et al. | |
| 6,388,789 B1 | 5/2002 | Bernstein | |
| 6,411,765 B1 | 6/2002 | Ono | |
| 6,526,198 B1 | 2/2003 | Wu et al. | |
| 6,654,523 B1 | 11/2003 | Cole | |
| 6,665,476 B1 * | 12/2003 | Braun et al. | 385/50 |
| 2002/0094151 A1 | 7/2002 | Li | |
| 2002/0181855 A1 * | 12/2002 | Xue et al. | 385/23 |

FOREIGN PATENT DOCUMENTS

| | | |
|---|---|---|
| EP | 0 545 584 | 11/1992 |
| EP | 1004910 A2 | 5/2000 |
| FR | 00 15751 A1 | 6/2002 |
| JP | 58068702 | 4/1983 |
| JP | 63063006 | 3/1988 |
| JP | 04177225 | 6/1992 |
| JP | 06109990 | 4/1994 |
| JP | 10123373 | 5/1998 |
| JP | 10-227986 | 8/1998 |
| WO | WO 01/77742 A2 | 10/2001 |

OTHER PUBLICATIONS

Benaissa, K.; and Nathan, A.; "Silicon Anti-Resonant Reflecting Optical Waveguides for Sensor Applications;" *Journal of Sensors and Actuators (A Physical)*, vol. A65, 33-44, 1998.

Brown, K.S.; Taylor, B.J.; Dawson; J.M.; Homak, L.A.; "Polymer Waveguide Co-Integration With Microelectromechanical Systems (MEMS) for Integrated Optical Metrology," *Proceedings of the SPIE (The International Society for Optical Engineering)*, vol. 3276, 1998.

Burcham, Kevin E.; and Boyd, Joseph T.; "Freestanding, Micromachined, Multimode Silicon Optical Waveguides at $\lambda = 1.3$ μm for Microelectromechanical System Technology;" *Journal of Applied Optics*, vol. 37, No. 36, Dec. 20, 1998.

Churenkov, A.V.; "Silicon Micromechanical Optical Waveguide for Sensing and Modulation;" *Journal of Sensors and Actuators (A Physical)*, vol. A57, No. 1, Oct. 1996.

Cook, J.P.D.; Este, G.O.; Shepherd, F.R.; et al.; "Stable, Low-Loss Optical Waveguides and Micromirrors Fabricated in Acrylate Polymers" *Applied Optics Journal*, vol. 37, No. 7, Mar. 1, 1998.

Cornett, Kimberly T.; Heritage, Jonathan P.; Solgaard, Olav; "Compact Optical Delay Line Based on Scanning Surface Micromachined Polysilicon Mirrors;" *2000 IEEE-LEOS International Conference on Optical MEMS*, Kauai, Hawaii, Aug. 21-24, 2000.

de Labachelerie, M.; Kaou, N.; et al.; "A Micromachined Connector for the Coupling of Optical Waveguides and Ribbon Optical Fibers;" *Journal of Sensors and Actuators (A Physical)*, vol. A89, No. 1-2, Mar. 20, 2001.

Eng, Terry T.H.; Kan, Sidney C.; and Wong, George K.L.; "Voltage-Controlled Micromechanical SOI Optical Waveguides;" *IEEE TENCON, IEEE Region 10 International Conference on Microelectronics and VLSL—"Asia Pacific Microelectronics 2000"—Proceedings*, 1995.

Eng, Terry T.H.; Kan, Sidney C.; and Wong, George K.L.; "Surface-Micromachined Epitaxial Silicon Cantilevers as Movable Optical Waveguides on Silicon-on-Insulator Substrates;" *Journal on Sensors and Actuators A, Physical*, vol. A49, No. 1-2, Jun. 1995.

Eng, Terry T.H.; Kan, Sidney C.; and Wong, George K.L.; "Surface-Micromachined Movable SOI Optical Waveguides;" *Proceedings of the International Solid-State Sensors and Actuators Conference—Transducer*, 1995.

Gorecki, Christophe; "Optimization of Plasma-Deposited Silicon Oxinitride Films for Optical Channel Waveguides;" *Journal of Optics and Laser Engineering*, vol. 33, No. 1, Jan. 2000.

Haronian, D.; "Bottlenecks of Opto-MEMS;" *SPIE Proceedings—Micro-Opto-Electro-Mechanical Systems*, Glasgow, UK, May 22-23, 2000.

Haronian, D.; "Displacement Sensing Using Geometrical Modulation in Reflection Mode (GM-RM) of Coupled Optical Waveguides;" *Journal of Micromechanics and Microengineering*, vol. 8, No. 4, Dec. 1998.

Haronian, D.; "Suspended Optical Waveguide With In-Plane Degree of Freedom or Microelectro-Mechanical Applications;" *Electronics Letters*, vol. 34, No. 7, 2nd Apr. 1998.

Hoffmann, Martin; Kopka, Peter; and Voges, Edgar; "Thermooptical Digital Switch Arrays n Silica-on-Silicon With Defined Zero-Voltage State;" *Journal of Lightwave Technology*, vol. 16, No. 3, Mar. 1998.

Jin, Young-Hyun; Seo, Kyoung-Sun; et al.; "An SOI Optical Microswitch Integrated With Silicon Waveguides and Touch-down Micromirror Actuators;" *2000 IEEE-LEOS International Conference on Optical MEMS*, Aug. 21-24, 2000.

Koyanagi, Mitsumasa; "Optical Interconnection Using Polyimide Waveguide for Multi-Chip Module;" *Proceedings of SPIE, Society of Photo-Optical Instrumentation Engineers*, San Jose, CA, 1996.

Kruger, Michiel V.P.; Guddal, Michael H.; et al.; "Low Power Wireless Readout of Autonomous Sensor Wafer Using MEMS Grating Light Modulator;" *2000 IEEE-LEOS International Conference on Optical MEMS*, Kauai, Hawaii, Aug. 21-24, 2000.

Kuwana, Yasuhiro;Hirose, Akinori; Kurino, Hiroyuki; et al.; "Signal Propagation Characteristics in Polyimide Optical Wave-guide With Micro-Mirrors for Optical Multichip Module;" *Japanese Journal of Applied Physics*, vol. 38, No. 4B, Apr. 1999.

Makihara, M.; "Microelectromechanical Intersecting Waveguide Optical Switch Based on Thermo-Capillarity;"

*2000 IEEE-LEOS International Conference on Optical MEMS*, Kauai, Hawaii, Aug. 2124, 2000.

Makihara, M.; Sato, Makoto: Shimokawa, Fusao; et al.; "Micromechanical Optical Switches Based on Thermocapillary Integrated in Waveguide Substrate;" *Journal of Lightwave Technology*, vol. 17, No. 1, Jan. 1999.

Makihara, M.; Shimokawa, F.; and Nishida, Y.; "Self-Holding Optical Waveguide Switch Controlled by Micromechanism;" *IEICE Trans. Electronics (Japan)*, vol. E80-C, No. 2, Feb. 1997.

Maoisel, J.; Guttmann, J.; Huber, H.P.; et al.; "Optical Backplanes With Integrated Polymer Waveguides;" *Journal of Optical Engineering*, vol. 39, No. 3, Mar. 2000.

Maruo, Shoji; Ikuta, Koji; and Ninagawa, Toshihide; "Multi-Polymer Microstereolithography for Hybride Opto-MEMS" has the same information as "Advanced Micro Sterelithography with Multi UV Polymers (System Development and Application to Three-Dimensional Optical Waveguides)," which is written in Japanese; *Journal of Transactions of the Institute of Electrical Engineers of Japan, Part E*, vol. 120-E, No. 7, Jul. 2000.

Matsumoto, Takuji; Kuwana, Yasuhiro; Hirose, Akinori; "Polyimide Optical Waveguide With Multi-Fan-Out for Multichip Module System;" *Proceedings from the Optoelectronic Interconnects V*, vol. 3288, San Jose, CA Jan. 28-29, 1998.

Matsumoto, Takuji; Fukuoka, Takeshi; Kurino, Hiroyuki; et al.; "Polyimide Optical Waveguide With Multi-Fan-Out for Multi-Chip Module Application;" *Proceedings of the 27th European Solid-State Device Research Conference*, France, Sep. 22-24, 1997.

Matsumoto, Takuji et al.; "Polyimide Optical Waveguide with Multi-Fan-Out for Multi-Chip Module Application," *Jpn. J. Appl. Phys.*, vol. 36 (1997) Pt. 1, No. 38. pp. 1903-1906.

Mueller, Raluca; Pavelescu; and Manea, Elena; "3D Microstructures Integrated With Optical Waveguides and Photodiodes on Silicon," *MELECOB 1998 9th Mediterranean Electromechanical Conference Proceedings*, vol. 1; May 18-20, 1998.

Namba, Tohru; Uehara, Akihito; et al.; "High-Efficiency Micromirrors and Branched Optical Waveguides on Si Chips;" *Japanese Journal of Applied Physics, Part 1*, vol. 35, No. 2B, Aug. 21-24, 1995.

Oillier, Eric; Chabrol, Claude; et al.; "1×8 Micro-Mechanical Switches Based on Moving Waveguides for Optical Fiber Network Switching;" *2000 IEEE-LEOS International Conference on Optical MEMS*, Aug. 21-24, 2000.

Ollier, Eric; and Mottier, P.; "Micro-Opto-Electro-Mechanical Systems: Recent Developments and LEIT's Activities," *Proceedings of the SPIE—The International Society for Optical Engineering*, vol. 4076, May 22-24, 2000.

Shubin, I.; and Wa, P.L.K.; "Electrostatically Actuated 1×2 Micro-Mechanical Optic Switch;" *Electronics Letters*, vol. 37, No. 7; Mar. 29, 2001.

Storgaard-Larsen, Torben; "Plasma-Enhanced Chemical Vapor Deposited Silicon Oxynitride Films for Optical Waveguide Bridges for Use in Mechanical Sensors;" *Journal of the Electromechanical Society*, vol. 144, No. 4, Apr. 1997.

Voges, E.; Hoffmann, M.; "FB1 Optical Waveguides on Silicon Combined With Micromechanical Structures;" *Advanced Applications of Lasers in Materials and Processing: LEOS Summer Optical Meeting*, 1996; IEEE, Piscataway, New Jersey, 96TH8154.

Yariv, A.; "Universal Relations for Coupling of Optical Power Between Microresonators and Dielectric Waveguides;" *Journal of Electronics Letters*, vol. 36, No. 4, Feb. 17, 2000.

Yokoyama, S.; Nagata, T.; and Kuroda, Y.; et al.; "Optical Waveguides on Silicon Chips;" *Journal of Vacuum Science & Technology A*, vol. 13, No. 3, May-Jun. 1995.

"Switch Fabric Topologies," Dept. of Computer Science, University of Crete, CS-534: Packet Switch Architecture, Mar. 28, 2001.

\* cited by examiner

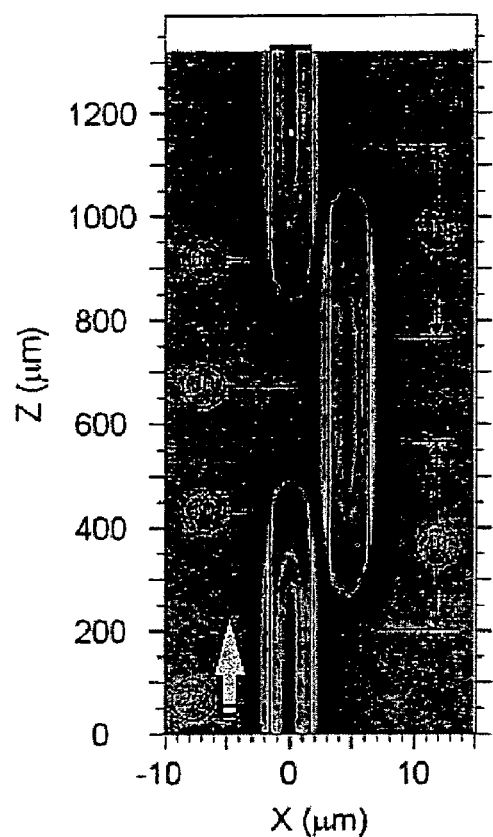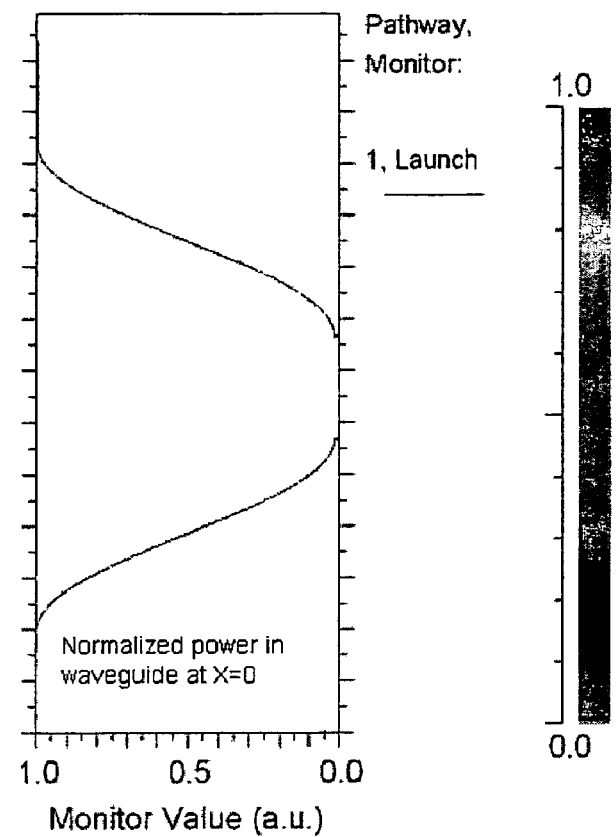
FIG. 5A                              FIG. 5B

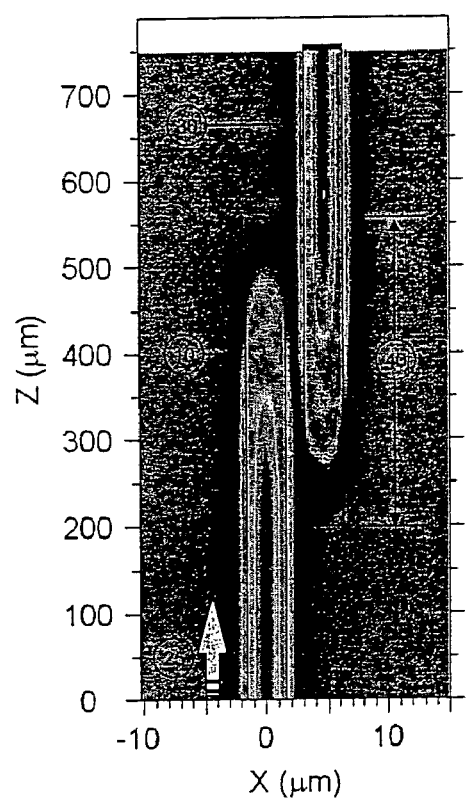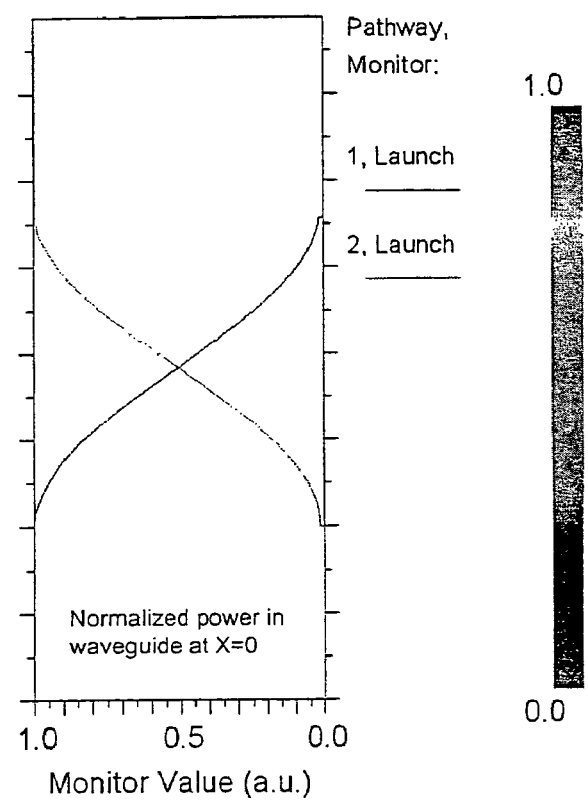
Figure 9a
Figure 9b

LOW-LOSS OPTICAL WAVEGUIDE CROSSOVERS USING AN OUT-OF-PLANE WAVEGUIDE

CROSS-REFERENCE TO RELATED APPLICATIONS

This application claims priority to U.S. provisional application Ser. No. 60/467,341, filed May 1, 2003, and U.S. provisional application Ser. No. 60/485,065, filed Jul. 7, 2003, both of which are fully incorporated herein by reference.

BACKGROUND OF THE INVENTION

1. Field of the Invention

The field of the invention is optical waveguides and more particularly, optical waveguide crossovers.

2. Background

In many planar lightwave circuit (PLC) designs, waveguide intersections (or crossovers) are unavoidable. This is particularly true of designs that involve switch interconnect patterns. For instance, for an N×N Spanke switch architecture, there are as many as $(N-1)^2$ crossovers in just one optical path. For example, the maximum number of crossovers in an 8×8 Spanke switch is 49. Each crossover is notorious for contributing to optical loss and can be the source of crosstalk into other channels.

FIG. 1 illustrates an example of a prior art 4×4 Spanke switch. It consists of four 1×4 switch elements (1)–(4) opposite four additional 1×4 switch elements (5)–(8). Each of the four outputs from switch element (1) must have a waveguide connection to a single input on each of switch elements (5), (6), (7), and (8). Likewise, each of the outputs from switch element (2) must have a waveguide connection to a single input on each of switch elements (5), (6), (7), and (8); and so on. This results in an interconnect pattern with waveguide paths having as few as zero crossovers (2 paths), and as many as 9 crossovers (2 paths). For example, connecting waveguide (10) to waveguide (20) requires crossovers at points (31)–(39). There are many ways to realize this interconnect pattern, but as long as it is done in a single plane, these are the minimum number of crossovers.

The usual prior art approach to creating crossovers with minimum optical loss and minimum crosstalk is to design the waveguide pattern such that all waveguide cores intersect at right angles (as shown in FIG. 1), and yet otherwise remain in the same plane. FIG. 2 is a detailed view of the prior art waveguide cores of FIG. 1 at locations (31)–(33). It shows waveguide core (10) occupying the same space as waveguide cores (11), (12), and (13) at locations (31), (32), and (33), respectively.

Because the waveguide cores intersect at right angles, the optical loss and crosstalk are minimized by virtue of the intersecting waveguide (11), (12), or (13) having the minimum vectorial component in the direction of light propagation (25). However, there is still some finite loss caused by each core intersection. This loss arises from diffraction and mode mismatch at each intersection. FIG. 3 is a graphic of the Beam Propagation Method (BPM) simulation results from intersecting waveguide cores. It shows the light propagating in waveguide core (10) as it crosses waveguide core (11). The direction of propagation is shown by the arrow (25). As soon as the light reaches the leading edge of the intersecting waveguide (26), the light is unguided in the x direction and diffracts according to optical diffraction principles. When this diffracted light reaches the opposite side of the intersecting waveguide (27), the E-field profile, or mode profile, is spread out and no longer has the same profile it had when it was originally guided. Therefore, the light will not completely re-couple back into waveguide (10). A fraction of the light will be lost to the cladding as shown (28).

The loss from each crossover can be approximated by:

$$L_{cross} \approx -10 \cdot \log\left[1 - (4\Delta/v^2)(a/w_0)^4\right] \text{ dB}$$

where: $\Delta = (n_1^2 - n_0^2)/(2n_1^2)$ $$v = (2\pi a/\lambda)(n_1^2 - n_0^2)^{1/2}$$

where $n_0$ is the cladding index, $n_1$ is the core index, a is the core half-width, $\lambda$ is the wavelength of the light, and $w_0$ is the radius of the propagating mode at which the E-field is $e^{-1} = 36.8\%$ of its maximum, $E_0$. It is determined by first evaluating the E-field for points along the radial distance, x, which cannot be solved by closed-form equations:

$$E_y = E_0 \cdot \cos(ux/a) \quad \text{for } |x| \leq a$$
$$= E_0 \cdot \cos(u) \cdot \exp[-(w/a)(|x| - a)] \quad \text{for } |x| > a$$

where: $w = u \cdot \tan(u)$ $$u = (v^2 - w^2)^{1/2}$$

These last two equations must be solved by recursion.

As an example of the loss that can be expected, a waveguide system with the following characteristics:

$n_0 = 1.450$;
$n_1 = 1.482$;
$a = 1.60$ um;
$\lambda = 1.55$ um will have the following parameters:

$\Delta = 0.0214$;
$v = 1.986667$ radians;
$w = 1.700426$ radians;
$u = 1.027325$ radians.

$w_0$ is determined by numerically evaluating $E_y$ for several values of x, and finding the value of x where $E_y = 0.368 E_0$. For this example, this value is $w_0 = 1.925$ um. Therefore, the loss per crossover ($L_{cross}$) is calculated to be approximately 0.045 dB. This result is also obtained by BPM software.

Therefore, there is a need for an improved waveguide crossover that has a lower loss and a method of creating an improved waveguide crossover.

SUMMARY OF THE INVENTION

The invention relates to an improved waveguide crossover that uses an out-of-plane waveguide, or other light carrying structure, to achieve lower loss, and a method of creating the improved waveguide crossover, as described herein.

In the example embodiments, a light signal from a first waveguide is coupled efficiently through directional coupling to a bridge waveguide in a different plane. The light signal optionally may be directionally coupled from the bridge waveguide to a second waveguide.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. All illustrations are intended to convey concepts, where relative sizes, shapes and other detailed attributes may be illustrated schematically rather than literally or precisely. Moreover, in the figures, like reference numerals designate corresponding parts throughout the different views. However, like parts do not always have like reference numerals.

FIG. 4b illustrates a cross-sectional view of the example embodiment of the improved waveguide crossover of FIG. 4a.

FIGS. 5a and 5b illustrate the BPM simulation results of the example embodiment of an improved waveguide crossover of FIG. 4a.

FIG. 6 illustrates a 4×4 Spanke switch that utilizes the improved waveguide crossover of FIG. 4a.

FIGS. 7a–7i show a fabrication sequence that may be used to manufacture the improved waveguide crossover of FIG. 4a.

FIG. 8b illustrates a cross-sectional view of the example preferred embodiment of the improved waveguide crossover of FIG. 8a.

FIGS. 9a and 9b illustrate the BPM simulation results of the example preferred embodiment of an improved waveguide crossover of FIG. 8a.

FIG. 10 illustrates a 4×4 Spanke switch that utilizes the improved waveguide crossover of FIG. 8a.

FIGS. 11a–11i show a fabrication sequence that may be used to manufacture the improved waveguide crossover of FIG. 8a.

DETAILED DESCRIPTION OF THE PREFERRED EMBODIMENTS

The improved method is described in which optical signals transmitted by a waveguide system can cross over multiple transverse waveguides with a greatly reduced loss of signal intensity by using a second waveguide (such as a bridge), or other similar light carrying structure, positioned in a second plane different from the plane containing the transverse waveguides. An optical signal from the input waveguide is coupled efficiently through a process called directional coupling, and similarly coupled to the output waveguide. The improved low-loss waveguide crossover enables the integration of multiple devices to perform complex optical functions using waveguides with very low loss due to crossovers.

Figure 4A:
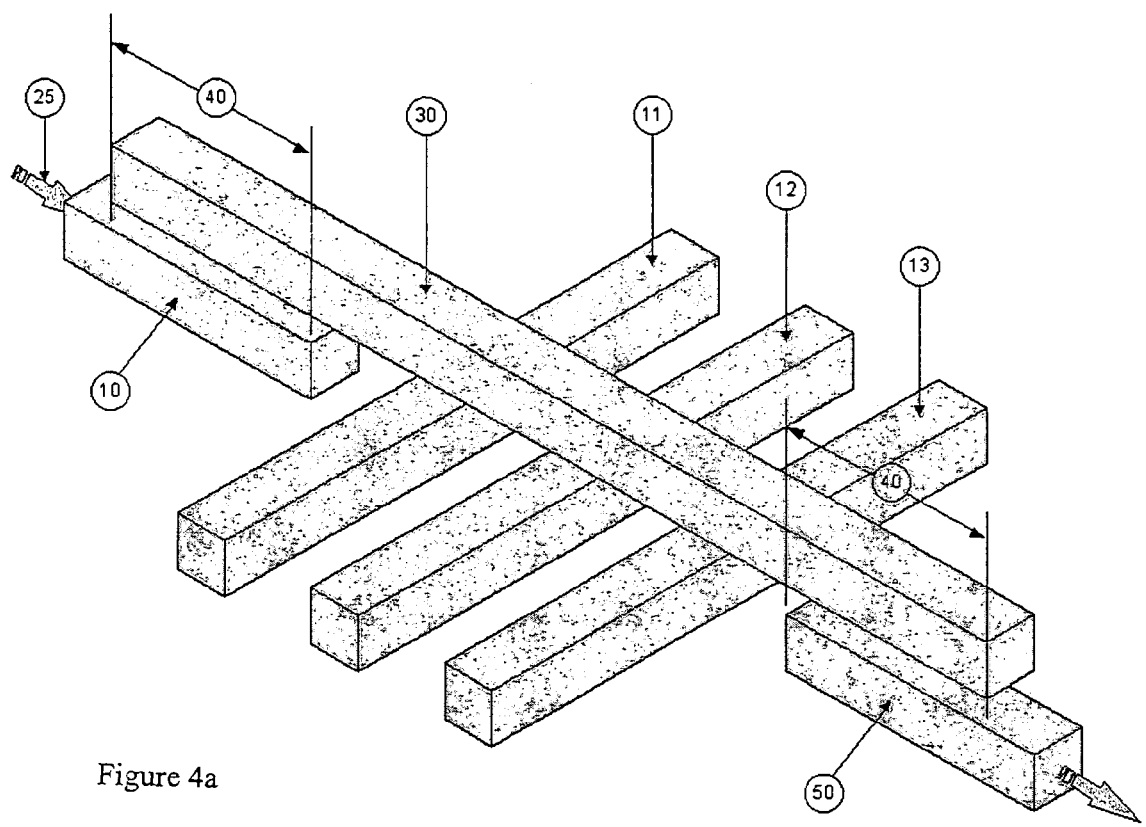
FIG. 4a illustrates an example embodiment of the waveguide core structure of an improved waveguide crossover.
Figure 4B:
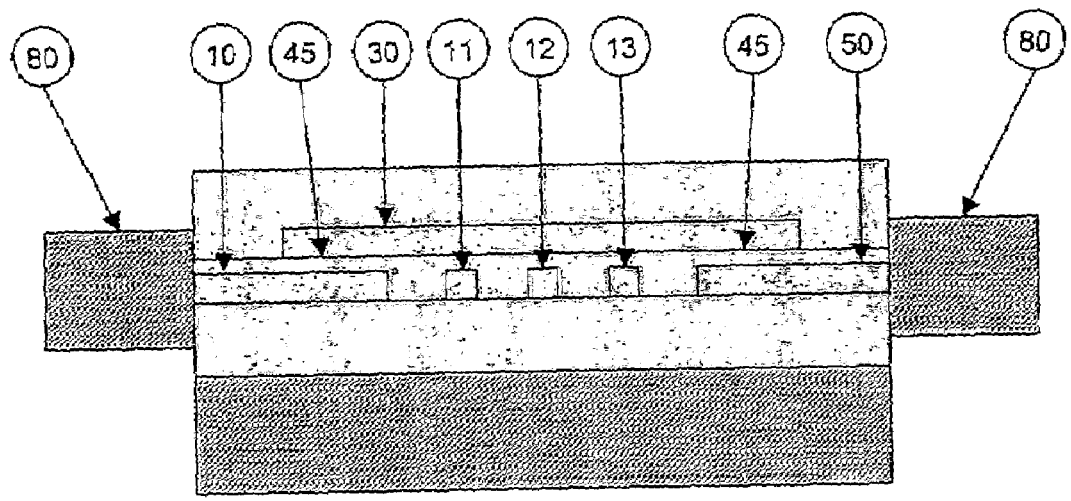

The improved low-loss waveguide crossover uses an out-of-plane, such as vertical, directional coupling to "bridge" over any number of waveguides with very low, or essentially no, optical loss or crosstalk. FIGS. 4a and 4b illustrate an example embodiment of a waveguide core structure of an improved low-loss waveguide crossover. The light propagating in waveguide core (10), in the direction of arrow (25), is optically coupled into waveguide core (30) by directional coupling.

Directional coupling is a well-understood waveguide phenomenon. Usually, however directional coupling is implemented in cores that are side-by-side, or on the same plane. Basically, light propagating in one waveguide can be 100% coupled into a neighboring parallel waveguide if the appropriate coupling conditions are met. This 100% coupling occurs over a propagation distance known as the coupling length. The coupling length is dependent upon the waveguide structure (e.g., core index, cladding index, and core dimensions), the separation between the cores, and the wavelength of light being propagated. If the waveguides neighbor each other for a distance longer than the coupling length, the light will begin to couple back into the original waveguide.

The improved low-loss waveguide crossover works by overlapping waveguide core (30) over waveguide core (10) by a distance (40) equal to the coupling length. Therefore, light propagating in the lower of the two cores, in the direction of the arrow, in the upper left of the diagram, is 100% coupled into the upper (bridge) core. Light in this bridge core can now be routed over any length and any number of waveguides with extremely low loss if the separation used in the coupling is relatively large (e.g., on the order of a core width). In a broadband application, there is an essentially zero loss in theory for a given wavelength, and a very small loss for other frequencies in the broadband. The light in waveguide core (30) is then introduced back down to the same level as waveguide core (10) by overlapping it with waveguide core (50) over a length equal to the coupling length (40).

FIG. 4b illustrates a cross-sectional view of the example embodiment of the improved waveguide crossover of FIG. 4a, which may be referred to as a "full bridge" crossover because, in the example embodiment, the light signal crosses up to a bridge and then crosses down. An interface structure (80) transmits input light to a lower plane waveguide core (10), such that coupling of the light occurs at the overlap (45) between the waveguide core (10) and bridge waveguide core (30). The light crosses over into the upper plane bridge waveguide core (30) and is transmitted along the bridge waveguide core (30), over perpendicular waveguides (11–13), and is coupled again at another overlap (45) to a lower plane waveguide core (50), then travels out to another interface structure (80).

FIGS. 5a and 5b are graphics of the BPM simulation results of the example embodiment of an improved waveguide crossover of FIG. 4a. FIG. 5a is a BPM simulation result showing X and Z axes. FIG. 5b is a graph of the power of the light in the waveguide, normalized at X=0. By this method, there is very little, or essentially no, light lost when crossing over waveguides. By this same virtue, there is also that much less crosstalk in the waveguides that have been bridged.

This method of creating low-loss optical waveguide crossovers can be implemented with any waveguide material system. Examples include doped silica, silicon oxynitride, sol-gel, silicon, polymer, GaAs, InP, LiNbO$_3$, or even fluid-based cores/claddings.

When faced with a design that requires many waveguide crossovers, implementing the improved low-loss waveguide crossover described in this patent specification will result in lower loss and lower crosstalk. If one had used the aforementioned prior art, the total loss due to crossovers ($L_T$) is equal to the loss from each crossover ($L_{cross}$) multiplied by the total number of crossovers (C), or $L_T=C(L_{cross})$.

By using the above embodiment of the improved low-loss waveguide crossover in FIG. 4a, the total loss due to crossovers is equal to the coupling loss at each end of the "bridge" ($L_{coupling}$), plus the slight loss due to bridging over each waveguide ($L_{bridge}$), or:

$$L_T=2(L_{coupling})+C(L_{bridge})$$

The following example demonstrates the loss improvement offered by the improved low-loss waveguide crossover in FIG. 4a. First, let's assume a waveguide system with the aforementioned parameters:

$n_0$=1.450
$n_1$=1.482
a=1.60 um
λ=1.55 um

In the prior art approach, the loss due to each crossover is 0.045 dB. If we assume the 49 crossovers necessary for an 8×8 Spanke switch, the total loss is 2.2 dB. By employing the improved low-loss waveguide crossover in FIG. 4a, and assuming a center-to-center core separation (D) of 4.7 um and a coupling length of 368 um for the bridge core, $L_{coupling}$=0 and $L_{bridge}$=0.002. Therefore, the total loss after 49 crossovers is reduced to 0.1 dB.

It should be noted, however, that whereas the prior art method is relatively insensitive to wavelength, the loss of the improved low-loss waveguide crossover in FIG. 4a is wavelength dependent. In theory, the coupling length is zero loss only for a particular wavelength. However, even for the broadband wavelength range of 1.53 to 1.60 um (telecommunications C and L bands combined), the maximum $L_{coupling}$ is only 0.05 db. Therefore, the worst-case total loss is still only 0.2 dB for the improved low-loss waveguide crossover.

Figure 1:
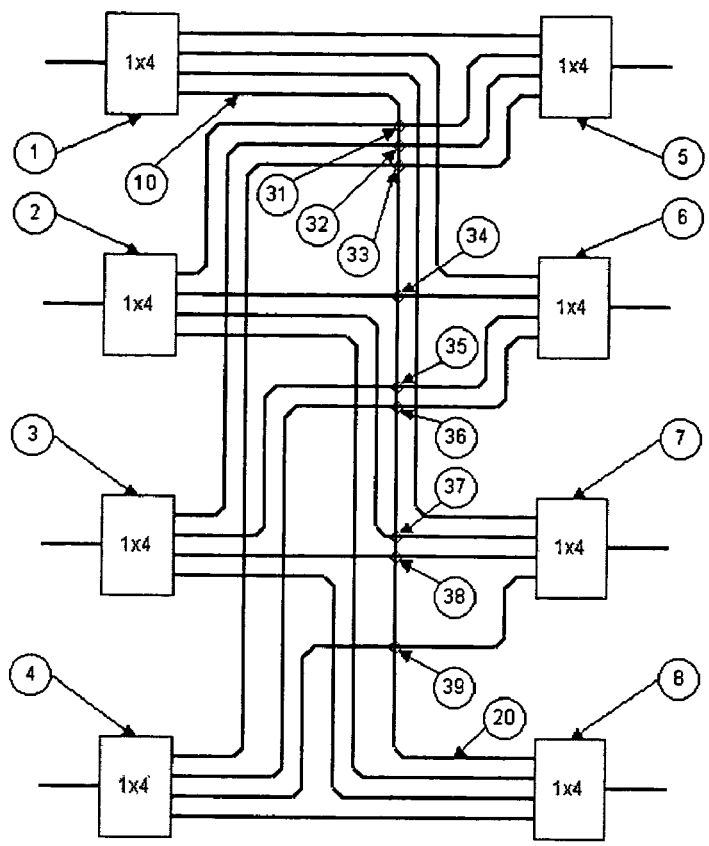
FIG. 1 illustrates a prior art 4×4 Spanke switch.
Figure 2:
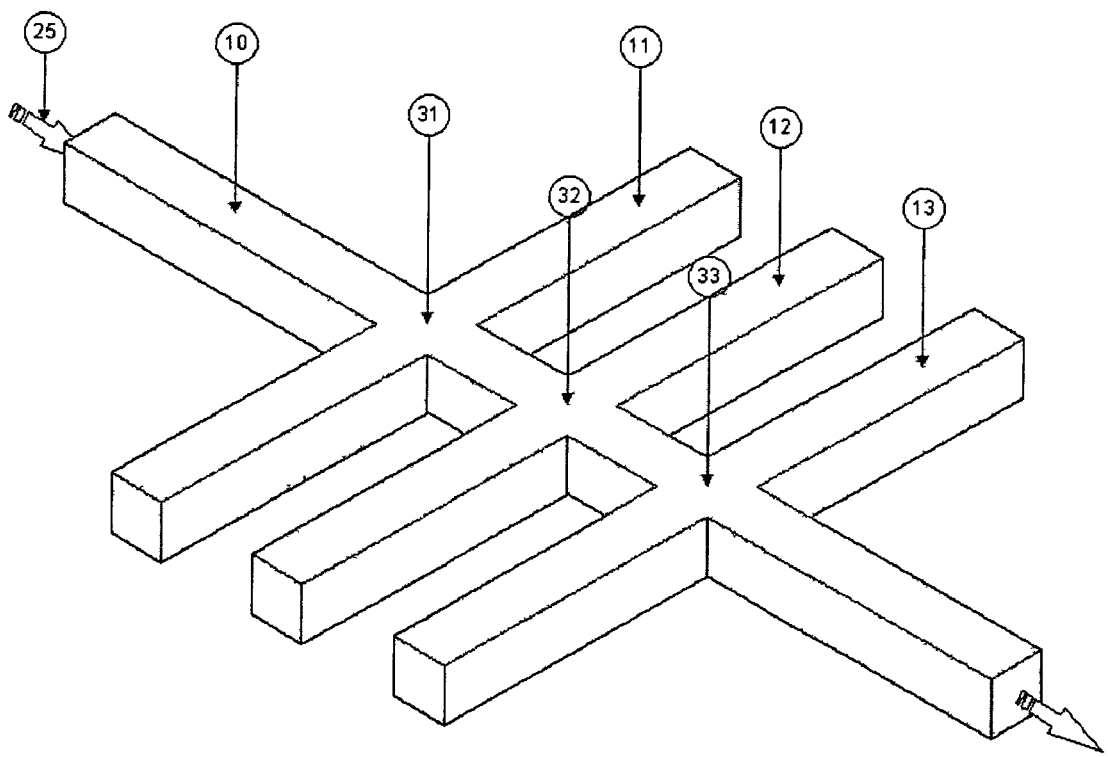
FIG. 2 is a detailed view of the prior art waveguide cores of FIG. 1 at locations (31)–(33).
Figure 3:
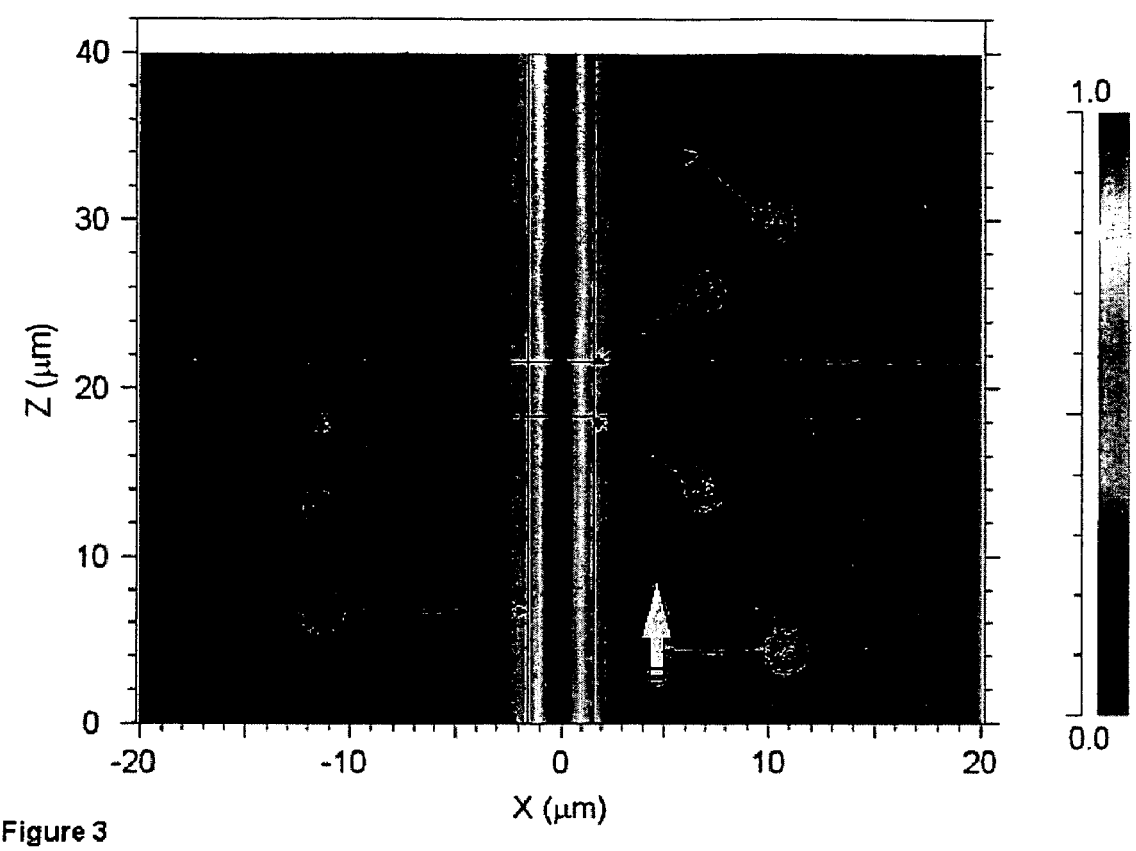
FIG. 3 illustrates the BPM simulation results from intersecting waveguide cores of FIG. 2.
Figure 6:
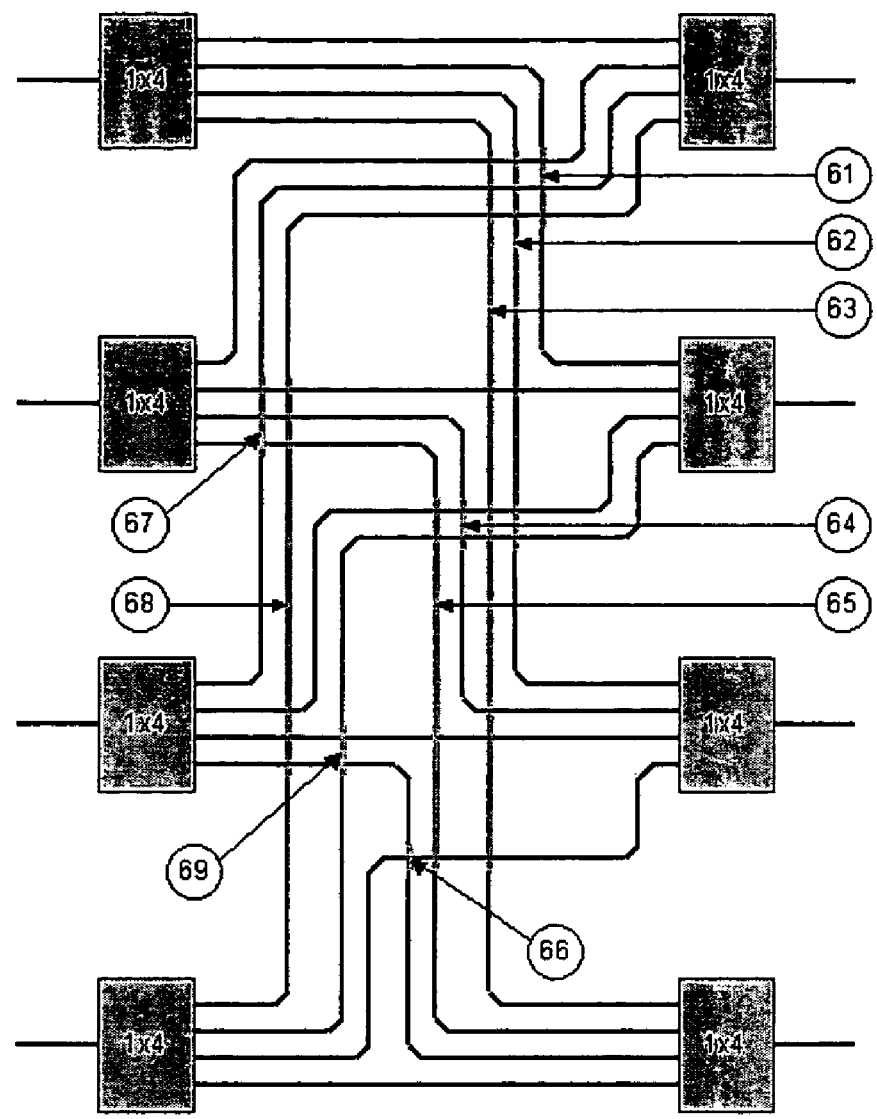

The improved method can also be easily implemented with very few bridges, thus reducing the coupling loss for any single path. FIG. 6 illustrates the same interconnect pattern shown in FIG. 1, but uses the improved waveguide crossovers instead. Note that with only nine bridges (laid out in the vertical pattern as shown), all 36 of the intersection points in the pattern can be bridged. These nine bridges are denoted by segments (61)–(69). It can be shown that only (N–1)² bridges are required to eliminate all intersecting crossovers on a N×N Spanke switch if the layout geometry is appropriately chosen.

Figure 7:
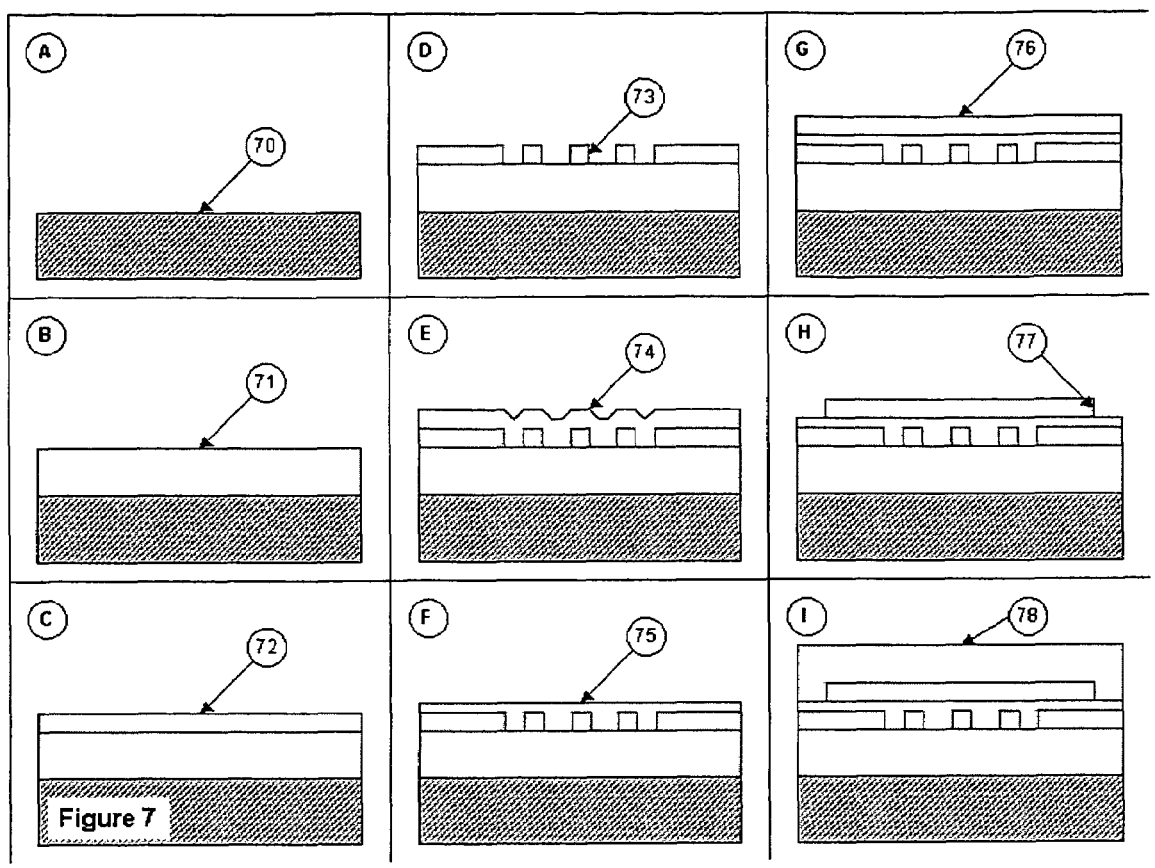

The waveguide structure for the improved low-loss waveguide crossover can be created by processes typically used in creating buried-channel waveguides. FIGS. 7a–7i show a fabrication sequence that can be used to make the improved waveguide crossover of FIG. 4a. First, in FIG. 7b, a low-index lower cladding (or buffer) layer (71) is thermally grown or deposited on the substrate (70). Next, in FIG. 7c, a higher-index core layer (72) is deposited on the lower cladding layer (71). As shown in FIG. 7d, this core layer is then patterned and etched, resulting in the lower-level core structure (73) with its input, output, and transverse waveguide cores. Next, as shown in FIGS. 7e and 7f, a low-index upper cladding (74) is deposited and planarized (75). The thickness of this upper cladding layer (74) must be very accurately controlled. In order to do this, this upper cladding layer (74) must be consolidated/reflowed with very accurate control, or it must controlled by chemical mechanical planarization (CMP). After this step, as shown in FIG. 7g, an additional core layer (76) is deposited on the upper cladding layer (74). As shown in FIG. 7h, this core layer (76) is then patterned and etched, resulting in the upper-level core structure (77), which forms the "bridge" core. And finally, as shown in FIG. 7i, the low-index upper cladding (78) is deposited.

Figure 8A:
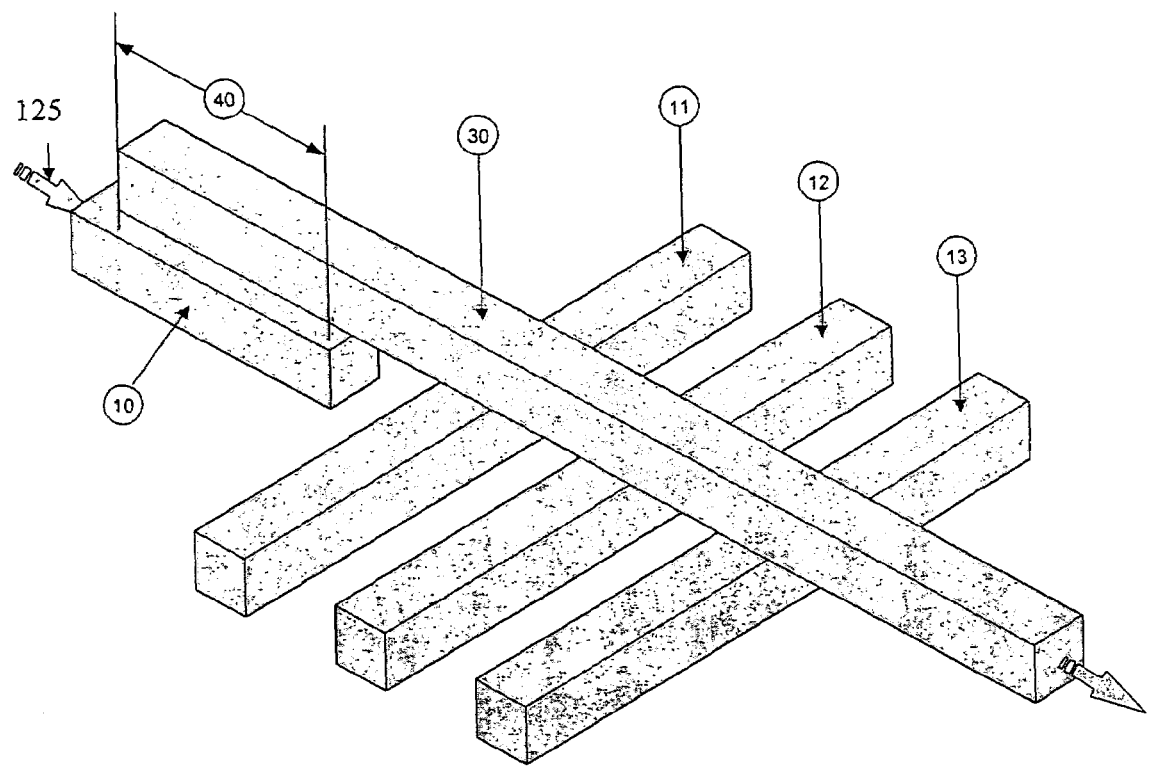
FIG. 8a illustrates an example of a preferred embodiment of a waveguide core structure of an improved low-loss waveguide crossover.
Figure 8B:
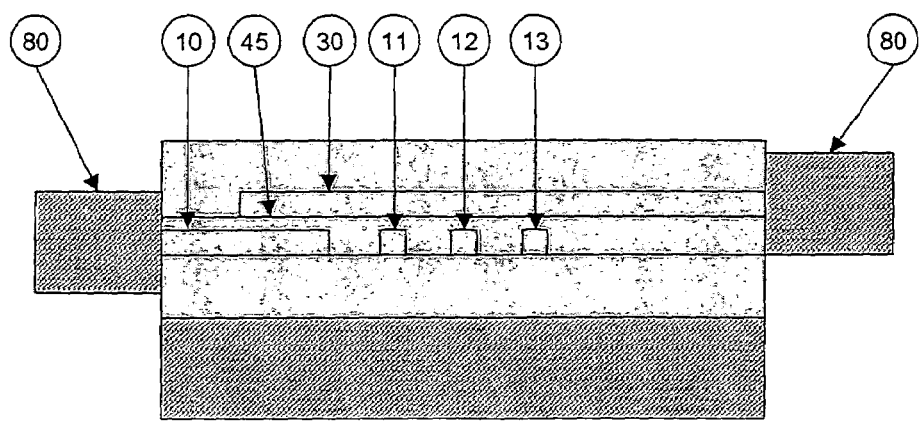

FIGS. 8a and 8b illustrate an example of a preferred embodiment of a waveguide core structure of an improved low-loss waveguide crossover. In this preferred embodiment, when light is coupled once from a waveguide core (10) on a first plane (depicted as a lower plane, for example) to a waveguide core (30) on a second plane (here depicted as an upper plane, for example), the light does not need to be coupled back to the first plane to continue forward propagation. One coupling occurs instead of two, and the expected loss from two couplings is now reduced by one-half. This example of a preferred embodiment that uses one out-of-plane coupling instead of two, relies on vertical, or out-of-plane, directional coupling to "bridge" over any number of waveguides with very low, or essentially no, optical loss or crosstalk. This method uses one coupling bridge to complete light transition from one plane to another.

As shown in FIG. 8a, the light propagating in waveguide core (10) in a first plane, in the direction of arrow (125), is optically coupled into another waveguide core (30) in a second plane by directional coupling. By contrast, the light in FIG. 4a is coupled from the waveguide core (10) in a first plane to another waveguide core (30) in a second plane, and then coupled back to a waveguide core (50) in the first plane.

FIGS. 9a and 9b illustrate the BPM simulation results of the example preferred embodiment of an improved waveguide crossover of FIG. 8a. FIG. 9a is a BPM simulation result showing X and Z axes. FIG. 9b is a graph of the power of the light in the waveguide, normalized at X=0. By this method, there is very little, or essentially no, light lost when crossing over waveguides. By this same virtue, there is also that much less crosstalk in the waveguides that have been bridged. As with FIGS. 4a and 4b, this method of creating low-loss optical waveguide crossovers can be implemented with any waveguide material system. Examples include doped silica, silicon oxynitride, sol-gel, silicon, polymer, GaAs, InP, LiNbO$_3$, or even fluid-based cores/claddings.

When faced with a design that requires many waveguide crossovers, the example preferred embodiment of an improved waveguide crossover of FIG. 8a will result in lower loss and lower crosstalk. In the prior art, the total loss due to crossovers ($L_T$) is equal to the loss from each crossover ($L_{cross}$) multiplied by the total number of crossovers (C), or:

$$L_T=C(L_{cross})$$

In the example preferred embodiment of an improved waveguide crossover of FIG. 8a, the total loss due to crossovers is equal to the coupling loss of the "bridge" ($L_{coupling}$), plus the slight loss due to bridging over each waveguide ($L_{bridge}$), or:

$$L_T=L_{coupling}+C(L_{bridge})$$

The following example demonstrates the loss improvement offered by the improved waveguide crossover of FIG. 8a. First, let's assume a waveguide system with the following parameters:

$n_0$=1.450
$n_1$=1.482 a=1.60 um
λ=1.55 um

In the prior art system, the loss due to each crossover would be 0.045 dB. If we assume the 49 crossovers necessary for an 8×8 Spanke switch, the total loss is 2.2 dB.

By employing the improved waveguide crossover of FIG. 8a, and assuming a center-to-center core separation (D) of 4.7 um and a coupling length of 368 um for the bridge core, $L_{coupling}$=0 and $L_{bridge}$=0.002. Therefore, the total loss after 49 crossovers is only 0.10 dB.

It should be noted, however, that whereas the prior art method is relatively insensitive to wavelength, the loss of improved waveguide crossover of FIG. 8a is wavelength dependent. The coupling length is zero loss only for a particular wavelength. However, even for the broadband wavelength range of 1.53 to 1.60 um (telecommunications C and L bands combined), the maximum $L_{coupling}$ is only 0.05 db. Therefore, the worst-case total loss is still only 0.15 dB for this example improved waveguide crossover of FIG. 8a.

Figure 10:
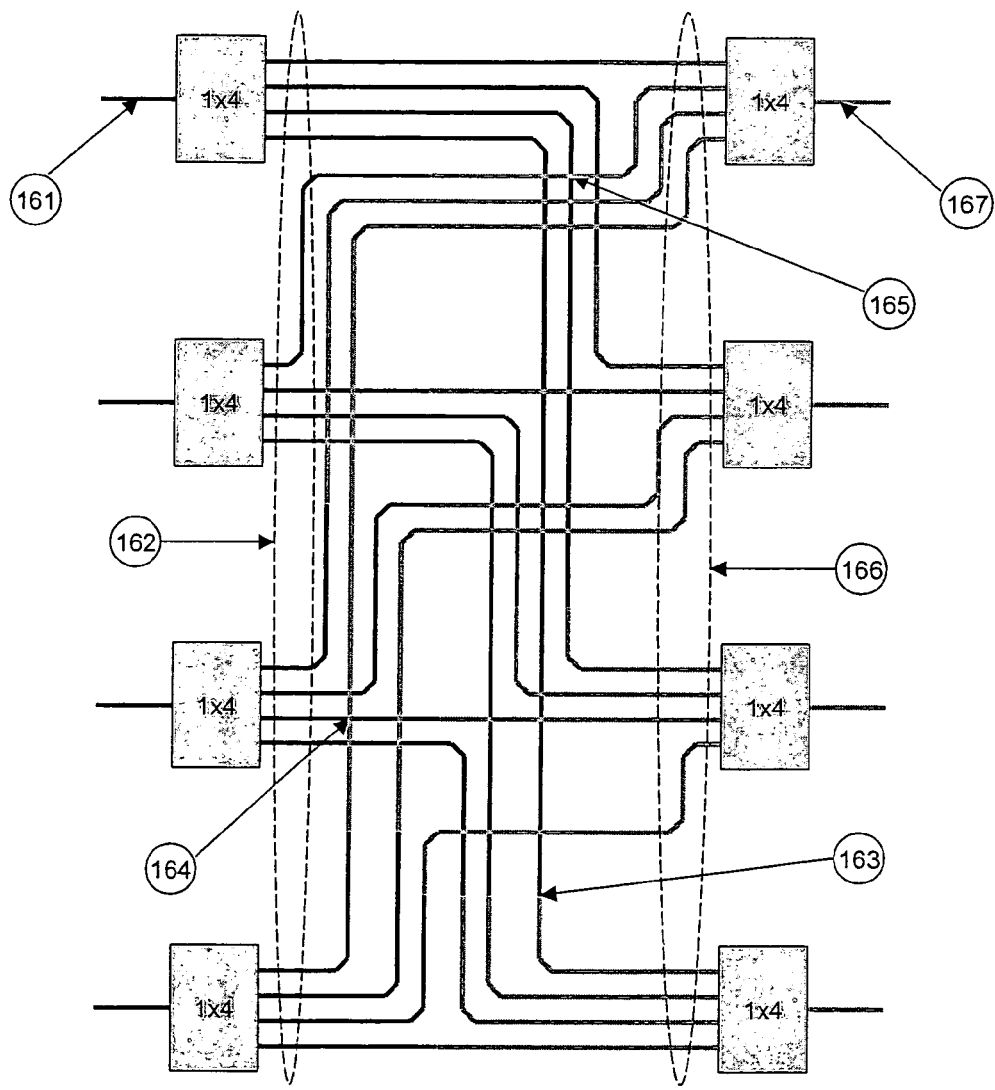

FIG. 10 illustrates a 4×4 Spanke switch that utilizes the improved waveguide crossover of FIG. 8a. FIG. 10 exhibits the same interconnect pattern shown in FIG. 1. Lower waveguide cores (161, 162) remain on this plane until a need occurs to "bridge" up over other lower waveguide cores. Waveguide coupling (163) occurs in convenient open areas. Bridge segments (164, 165) are laid out in a vertical and horizontal pattern, and all crossover points in the pattern are effectively bridged. Upper waveguide cores (166, 167) remain on this plane.

Figure 11:
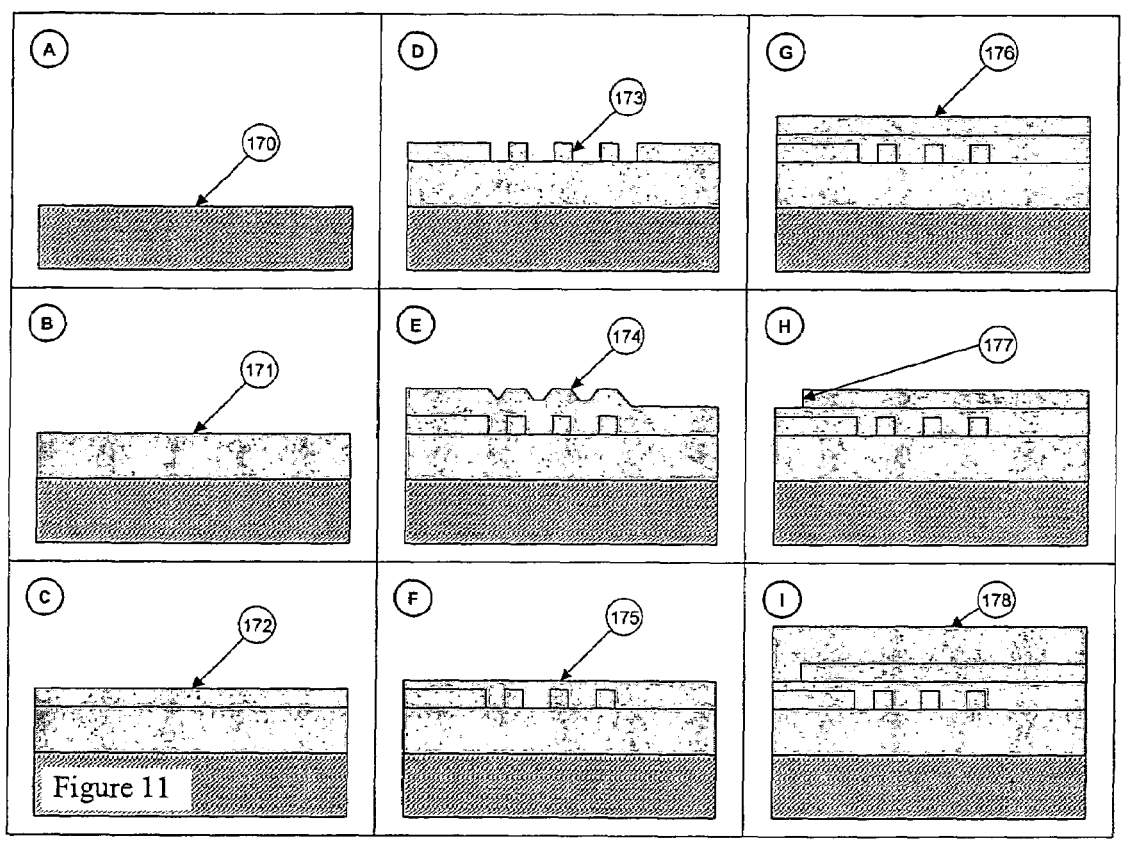

The waveguide structure for the improved low-loss waveguide crossover of FIG. 8a can be created by processes typically used in creating buried-channel waveguides. FIGS. 11a–11i show a fabrication sequence that may be used to manufacture the improved waveguide crossover of FIG. 8a. First, in FIG. 11b, a low-index lower cladding (or buffer) layer (171) is thermally grown or deposited on the substrate (170). Next, in FIG. 11c, a higher-index core layer (172) is deposited on the lower cladding layer (171). As shown in FIG. 11d, this core layer is then patterned and etched, resulting in the lower-level core structure (173) with its input, output, and transverse waveguide cores. Next, as shown in FIGS. 11e and 11f, a low-index upper cladding (174) is deposited and planarized (175). The thickness of this upper cladding layer (174) must be very accurately controlled. In order to do this, this upper cladding layer (174) must be consolidated/reflowed with very accurate control, or it must controlled by chemical mechanical planarization (CMP). After this step, as shown in FIG. 11g, an additional core layer (176) is deposited on the upper cladding layer (174). As shown in FIG. 11h, this core layer (176) is then patterned and etched, resulting in the upper-level core structure (177), which forms the "bridge" core. And finally, as shown in FIG. 11i, the low-index upper cladding (178) is deposited.

Another method of fabricating any of these multi-layer improved waveguide crossover couplers is via a bonded assembly. It can be envisioned that the lower cladding and lower core be deposited on one wafer, and the upper cladding and upper core be deposited on another wafer. The lower and upper core layers would then be patterned accordingly. The intermediate cladding could be deposited on one or the other wafer, or half on each. Then, the two wafer stacks can be sandwiched together to create the desired layer stack. An alternative to depositing the intermediate cladding layer would be to substitute it with an index matching fluid (i.e., having an index-matched to that of the cladding). Either method of fabrication could offer an alternative method of achieving a planarized, thickness-controlled intermediate cladding layer.

It should be noted that the transverse waveguides are not necessarily required to run at right angles to the bridge waveguide. Although the loss due to overcrossing each transverse waveguide ($L_{bridge}$) and the crosstalk into those waveguides will be increased for angles less than 90°, the loss and crosstalk may be acceptable for the given application in order to achieve a more compact interconnect layout. Alternatively for any of the embodiments, the bridge waveguide can be fabricated to reside beneath the transverse waveguides.

The amount of core overlap required for maximum coupling, known as the coupling length ($L_c$), is dependent upon the waveguide structure (e.g., core index, cladding index, and core dimensions), the separation between the cores, and the wavelength of light being propagated. The following equations describe directional coupling by giving the normalized optical power in the original waveguide ($P_a$) and in the coupled waveguide ($P_b$) as a function of propagation length (z):

$$P_a=1-F\cdot\sin^2[(\pi/2)(z/L_c)]$$

$$P_b=F\cdot\sin^2[(\pi/2)(z/L_c)]$$

where $F=1/[1+(\delta/\kappa)^2]$ $$L_c=\pi/[2(\kappa^2+\delta^2)^{1/2}]$$

$$\delta=(\beta_1-\beta_2)/2$$

$\beta_1$ and $\beta_2$ are the propagation constants of the two waveguides. If their cores have the same dimensions and indices, and reside in a common cladding, then $\beta_1=\beta_2$ and $\delta=0$. If $\delta=0$, the aforementioned general equations reduce to:

$$P_a=\cos^2[(\pi/2)(z/L_c)]$$

$$P_b=\sin^2[(\pi/2)(z/L_c)]$$

where $L_c=\pi/(2\kappa)$

Notice that only when $\delta=0$ ($\beta_1=\beta_2$) can the coupling efficiency reach 100%. The only variable yet to be described is κ, which is the coupling coefficient. Calculating the coupling coefficient is very involved and does not have a closed form solution (due to the requirement that the E-field distribution must be calculated). The coupling coefficient (or more directly, the coupling length) is best determined by beam propagation method (BPM) software. The slab waveguide approximation (which only treats the x-dimension, and not both x and y) simplifies the calculation, but it still does not have a closed-form solution. It should be noted that the slab waveguide results can vary significantly from rectangular-core results. The slab waveguide equations will be shown here only to show the dependencies and give an idea of the magnitude of the result. The slab waveguide coupling coefficient equation for the Transverse Electric (TE) mode component is:

$$\kappa = \omega\varepsilon_0(n_1^2-n_0^2)\int_{-a}^{a}E_{1y}E_{2y}\,dx \Big/ \left[(2\beta/\omega\mu_0)\int_{-\infty}^{\infty}|E_{1y}|^2\,dx\right]$$

where $$E_{1y} = A \cdot \cos(ux/a) \quad \text{for } |x| \leq a$$
$$= A \cdot \cos(u) \cdot \exp[-(w/a)(|x|-a)] \quad \text{for } |x| > a$$

and $$E_{2y} = A \cdot \cos(u) \cdot \exp[(w/a)(x-D+a)]$$

Figure 12:
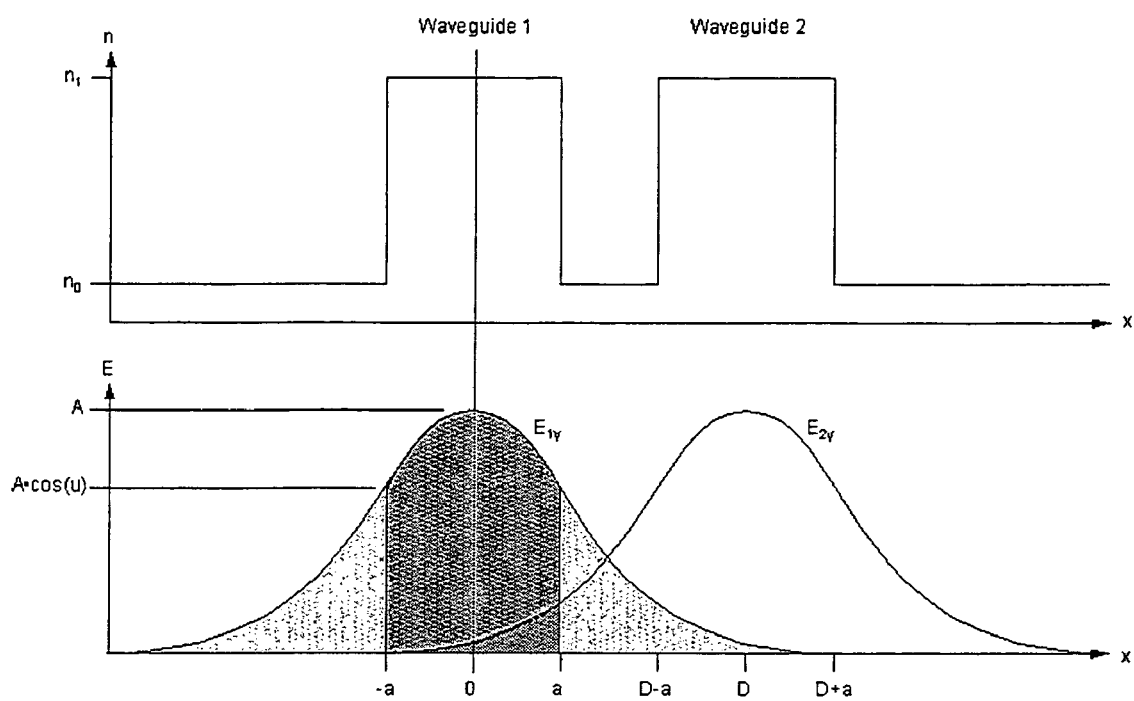
FIG. 12 is a graphic to help visualize the physical representations of certain equations.

A graphic to help visualize the physical representations of these equations is shown in FIG. 12. These equations can be reduced to:

$$\kappa = [(2\Delta)^{1/2} u^2 w^2 / a(1+w) v^3] \exp[-(w/a)(D-2a)],$$

where D is the center-to-center separation between the cores, and a is the core half-height. As aforementioned, the other variables are:

$$\Delta = (n_1^2 - n_0^2)/(2n_1^2)$$
$$v = (2\pi a/\lambda)(n_1^2 - n_0^2)^{1/2}$$
$$w = u \cdot \tan(u)$$
$$u = (v^2 - w^2)^{1/2}$$

These last two equations must be solved by recursion. For example, what is the coupling length for a waveguide system with the following parameters?
 $n_0$=1.450
 $n_1$=1.482
 a=1.60 um
 D=4.7 um
 $\lambda$=1.55 um Using the aforementioned equations:
 $\Delta$=0.0214
 v=1.986667 radians
 w=1.700426 radians
 u=1.027325 radians
 $\kappa$=0.00378 radians/um
 $L_c$=415 um Note that for a square core (with a=1.60 um and all other parameters remaining the same) the coupling length ($L_c$), as determined by BPM, is 368 um. This is 11% less than the slab waveguide result.

Also note that the coupling coefficient ($\kappa$), and hence the coupling length ($L_c$), become more wavelength dependent with larger core separation (D). This can be seen from the fact that u, v and w are all wavelength dependent; they all decrease with increasing wavelength. And the larger the value of D, the more weight w's wavelength dependence has on the exponent in $\kappa$, causing $\kappa$ to have a larger variation over the spectral band. Therefore, although it is desirable to make D as large as possible to minimize the loss due to bridging over each waveguide ($L_{bridge}$), there becomes a point where the wavelength-dependent coupling loss ($L_{coupling}$) increases the total loss more than C($L_{bridge}$) decreases the total loss over the spectral band. Of course, it can be envisioned that a material with a refractive index even lower than the intermediate cladding be substituted for the intermediate cladding layer just over the transverse cores (but not in the coupling region) such that the propagating mode field in the bridge interacts even less with the transverse waveguides, thus decreasing $L_{bridge}$ without encountering the increased wavelength-dependent loss that would otherwise arise from increasing D.

The example embodiment discussed is based on a doped silica material system. However, this method of creating low-loss optical waveguide crossovers can be implemented with other types of waveguide systems. The analysis of these systems is well known to those who practice the art of waveguide design.

While various embodiments of the application have been described, it will be apparent to those of ordinary skill in the art that many more embodiments and implementations are possible that are within the scope of the subject invention. For example, the reader is to understand that the specific ordering and combination of process actions described herein is merely illustrative, and the invention can be performed using different or additional process actions, or a different combination or ordering of process actions. As another example, each feature of one embodiment can be mixed and matched with other features shown in other embodiments. Features known to those of ordinary skill in the art of semiconductor processing or the art of optics may similarly be incorporated as desired. Additionally, features may be added or subtracted as desired and thus, a bridge system having more than one additional layer is also contemplated, whereby light can be coupled to any number of layers. This approach can be used to avoid crossovers at multiple levels.

We claim:

1. A waveguide system for propagating light signals comprising:
    a substrate;
    a first waveguide adapted to propagate a first light signal, the first waveguide having a first waveguide portion, the first waveguide portion running in a first direction on a first plane relative to the substrate;
    a second waveguide adapted to propagate a second light signal, the second waveguide having a second waveguide portion, the second waveguide portion running in a second direction on the first plane, the second direction being different than the first direction; and
    a third waveguide having a third waveguide portion, the third waveguide portion lying in a second plane, the second plane being different than the first plane, the third waveguide portion being directionally coupled with the second waveguide portion to propagate the second light signal from the second waveguide portion into the third waveguide portion, and the third waveguide having a fourth waveguide portion crossing over the first waveguide portion, the fourth waveguide portion not being substantially coupled with the first waveguide portion.

2. The waveguide system of claim 1, wherein the second plane is parallel to the first plane.

3. The waveguide system of claim 2, wherein the first plane is parallel to the substrate and lies between the substrate and the second plane.

4. The waveguide system of claim 1, wherein the first direction is substantially perpendicular to the second direction.

5. The waveguide system of claim 2, wherein the first direction is substantially perpendicular to the second direction.

6. The waveguide system of claim 1, wherein the third waveguide portion is directionally coupled to the second waveguide portion over a coupling length that achieves full or substantially near full coupling of the second light signal from the second waveguide portion to the third waveguide portion.

7. The waveguide system of claim 6, wherein the coupling length achieves full coupling of the second light signal from the second waveguide portion to the third waveguide portion.

8. The waveguide system of claim 1, wherein the third waveguide portion is directionally coupled to the second waveguide portion over a coupling length that achieves at least 90% of full coupling of the second light signal from the second waveguide portion to the third waveguide portion.

9. The waveguide system of claim 1, wherein the third waveguide portion is directionally coupled to the second waveguide portion over a coupling length that achieves at least 75% of full coupling of the second light signal from the second waveguide portion to the third waveguide portion.

10. The waveguide system of claim 6, wherein the coupling length depends on the characteristics of the second waveguide portion, the characteristics of the third waveguide portion, the separation between the second waveguide portion and the third waveguide portion, and the wavelength of the second light signal.

11. The waveguide system of claim 6, wherein the second plane is parallel to the first plane.

12. The waveguide system of claim 11, wherein the first plane is parallel to the substrate and lies between the substrate and the second plane.

13. The waveguide system of claim 6, wherein the first direction is substantially perpendicular to the second direction.

14. The waveguide system of claim 11, wherein the first direction is substantially perpendicular to the second direction.

15. The waveguide system of claim 12, wherein the third waveguide portion is directionally coupled to the second waveguide portion over a coupling length that achieves full or substantially near full coupling of the second light signal from the second waveguide portion to the third waveguide portion.

16. The waveguide system of claim 15, wherein the coupling length achieves full coupling of the second light signal from the second waveguide portion to the third waveguide portion.

17. The waveguide system of claim 12, wherein the third waveguide portion is directionally coupled to the second waveguide portion over a coupling length that achieves at least 90% of full coupling of the second light signal from the second waveguide portion to the third waveguide portion.

18. The waveguide system of claim 12, wherein the third waveguide portion is directionally coupled to the second waveguide portion over a coupling length that achieves at least 75% of full coupling of the second light signal from the second waveguide portion to the third waveguide portion.

19. The waveguide system of claim 15, wherein the coupling length depends on the characteristics of the second waveguide portion, the characteristics of the third waveguide portion, the separation between the second waveguide portion and the third waveguide portion, and the wavelength of the second light signal.

20. The waveguide system of claim 1, wherein the substrate is a semiconductor substrate.

21. The waveguide system of claim 12, wherein the substrate is a semiconductor substrate.

22. A waveguide system for propagating light signals comprising:

a substrate;

a first waveguide adapted to propagate a first light signal, the first waveguide having a first waveguide portion, the first waveguide portion running in a first direction on a first plane relative to the substrate;

a second waveguide adapted to propagate a second light signal, the second waveguide having a second waveguide portion, the second waveguide portion running in a second direction on the first plane, the second direction being different than the first direction;

a third waveguide having a third waveguide portion, the third waveguide portion lying in a second plane, the second plane being different than the first plane, the third waveguide portion being directionally coupled with the second waveguide portion to propagate the second light signal from the second waveguide portion into the third waveguide portion;

a fourth waveguide having a fourth waveguide portion, the fourth waveguide portion running in a fourth direction on the first plane, the fourth direction being different than the first direction; and the third waveguide having a fifth waveguide portion, the fifth waveguide portion lying in the second plane, the fifth waveguide portion being directionally coupled with the fourth waveguide portion to propagate the second light signal from the fifth waveguide portion into the fourth waveguide portion.

23. The waveguide system of claim 22, wherein the second plane is parallel to the first plane.

24. The waveguide system of claim 23, wherein the first plane is parallel to the substrate and lies between the substrate and the second plane.

25. The waveguide system of claim 22, wherein the fourth direction is substantially parallel to the second direction.

26. The waveguide system of claim 25, wherein the fourth direction is substantially perpendicular to the first direction.

27. The waveguide system of claim 22, wherein the fourth and fifth waveguide portions are directionally coupled over a coupling length that achieves full or substantially near full coupling of the second light signal from the fifth waveguide portion to the fourth waveguide portion.

28. The waveguide system of claim 27, wherein the coupling length achieves full coupling of the second light signal from the fifth waveguide portion to the fourth waveguide portion.

29. The waveguide system of claim 22, wherein the fourth and fifth waveguide portions are directionally coupled over a coupling length that achieves at least 90% of full coupling of the second light signal from the second waveguide portion to the third waveguide portion.

30. The waveguide system of claim 22, wherein the fourth and fifth waveguide portions are directionally coupled over a coupling length that achieves at least 75% of full coupling of the second light signal from the second waveguide portion to the third waveguide portion.

31. The waveguide system of claim 22, wherein the substrate is a semiconductor substrate.

* * * * *